United States Patent [19]

Allen, Jr. et al.

[11] Patent Number: 4,850,226

[45] Date of Patent: Jul. 25, 1989

[54] INTERFACE CIRCUIT FOR USE IN AN ECHO RANGING SYSTEM

[75] Inventors: C. Cameron Allen, Jr., Richardson; Peter J. Lagergren, Arlington, both of Tex.

[73] Assignee: Pandel Instruments, Inc., Grand Prairie, Tex.

[21] Appl. No.: 153,083

[22] Filed: Feb. 8, 1988

[51] Int. Cl.[4] .............................................. G01N 29/04
[52] U.S. Cl. ..................................... 73/610; 367/903; 310/317
[58] Field of Search ..................... 73/610, 642, 290 V; 367/137, 903, 908; 310/317

[56] References Cited

U.S. PATENT DOCUMENTS

| | | | |
|---|---|---|---|
| 3,989,963 | 11/1976 | Giaccardi | 367/903 |
| 4,507,762 | 3/1985 | Meyer et al. | 367/137 |
| 4,597,068 | 6/1986 | Miller | 367/903 |
| 4,701,893 | 10/1987 | Muller et al. | 367/903 |

Primary Examiner—Levy Stewart J.
Assistant Examiner—Louis M. Arana
Attorney, Agent, or Firm—David H. Judson

[57] ABSTRACT

An interface circuit for use in connecting a high frequency piezoelectric transducer to an input stage of an echo ranging system is described. The circuit includes first, second and third control transistors which are selectively switched by a state controller to control the operation of the circuit. The first transistor is controlled to generate a coherent acoustical pulse at a first predetermined time. The second transistor is controlled to damp the transducer output at a second predetermined time following the first predetermined time. The third transistor serves to clamp the input stage of the echo ranging system to ground until the pulse signal has been effectively transmitted. This operation insures the transducer is in a condition to immediately receive an echo pulse despite the proximity of the transducer to the target whose range is being measured.

10 Claims, 1 Drawing Sheet

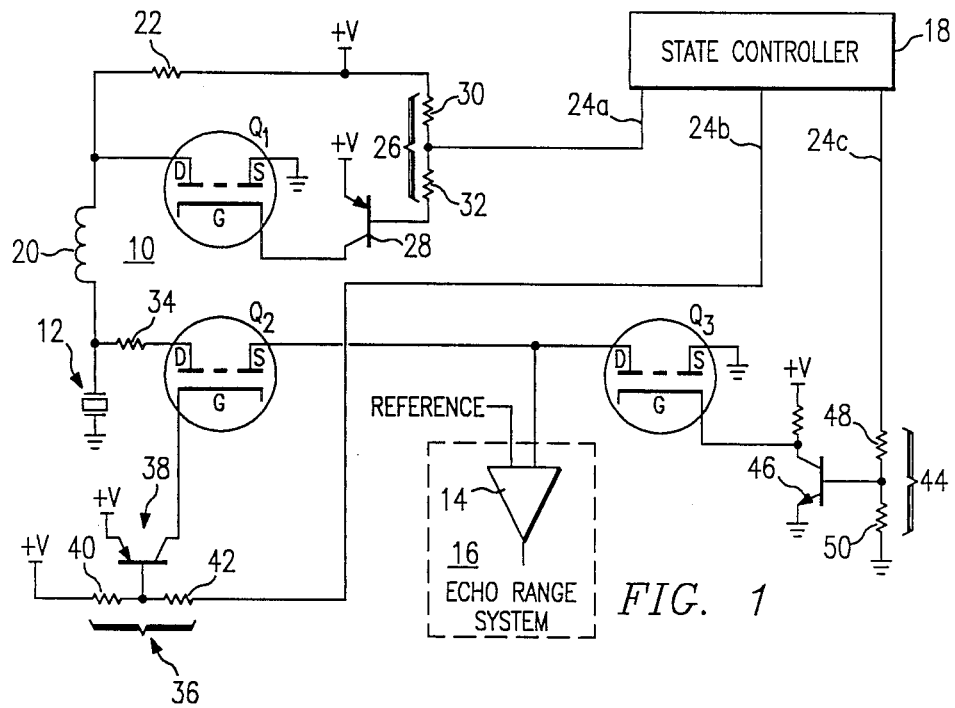
*FIG. 1*
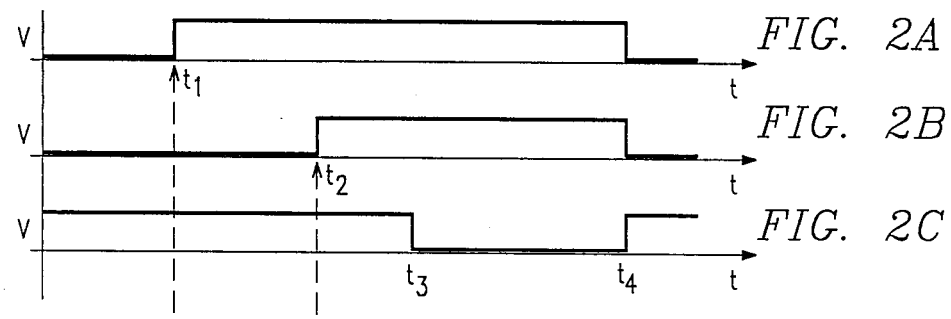
*FIG. 2A*
*FIG. 2B*
*FIG. 2C*
*FIG. 3*
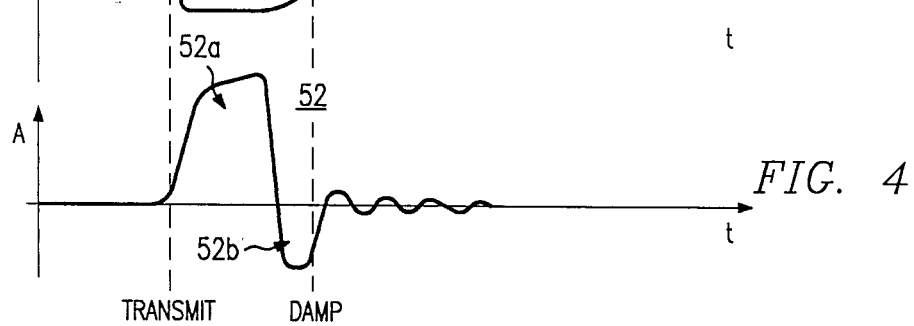
*FIG. 4*
TRANSMIT    DAMP

INTERFACE CIRCUIT FOR USE IN AN ECHO RANGING SYSTEM

TECHNICAL FIELD

The present invention relates generally to precision ranging techniques and more particularly to a novel interface circuit for use in an echo ranging system.

BLACKGROUND OF THE INVENTION

It is known in the prior art to use an echo ranging system to measure the level of fuel in a storage tank or the like. Such systems typically include a piezoelectric transducer which acts as a transmitter and a receiver. In operation, the transducer is excited to generate a series of pulses which are transmitted through a volume of fuel to a liquid surface and then reflected back to the transducer. The reflected pulses are processed by the echo ranging system to determine the distance to the liquid surface and thus the volume of fuel in the tank.

Prior art echo ranging systems of the type described above are not well-suited for precision applications if the minimum ranging distance is small (e.g., where the transducer is located near the liquid surface to be measured) or large (such that there is substantial uncertainty about the time-of arrival of the return pulses). In the former case, inaccuracies arise because the transducer output does not have an opportunity to decay following transmission of the ranging pulses. The transducer therefore cannot be in a condition to "listen" for the reflected pulses. In the case where the liquid surface is located substantially away from the transducer, the pulses typically break up or scatter during transmission, thereby creating uncertainty as to the arrival time, if any, of the reflected pulses. In both cases the echo ranging system cannot accurately determine the displacement to the liquid surface.

There is therefore a need for an interface circuit for use in an echo ranging system which facilitates precision ranging when the minimum ranging distance is on the same order of magnitude as the period of the transducer pulse transmission cycle or when the maximum ranging distance is such that the arrival time of the reflected pulses is uncertain.

BRIEF SUMMARY OF THE INVENTION

The limitations of prior art echo ranging systems are overcome through use of a novel interface circuit according to the invention for interfacing a high frequency piezoelectric transducer to an input stage of the ranging system. The interface circuit advantageously serves to generate and transmit a coherent acoustical shockwave comprising a substantially halfwave acoustical pulse. Following transmission, the interface circuit immediately damps the transducer output to facilitate receipt of a return or "echo" pulse. If the transmitted pulse breaks-up during transmission or is scattered upon hitting the liquid surface, no return pulse is received by the transducer. However, because only a single coherent pulse is transmitted, any energy received following damping will necessarily reflect true range information as opposed to ambient noise or other naturally occurring phenomena. The interface circuit therefore enables accurate ranging even when the transducer is located substantially near to or far from the liquid surface (or other target) to be measured.

According to the invention, the interface circuit includes a voltage source and an inductor for charging the transducer to a predetermined voltage and frequency. The interface circuit also includes first, second and third high voltage, low resistance control transistors, as well as a state controller for controlling the operation of the control transistors. The first control transistor activates the transducer, the second control transistor damps the transducer output, and the third control transistor isolates the transducer from the remainder of the echo ranging system during the transmission and damping cycles of operation.

BRIEF DESCRIPTION OF THE DRAWINGS

For a more complete understanding of the present invention and the advantages thereof, reference is now made to the following description taken in conjunction with the accompanying drawings in which:

FIG. 1 is a schematic block diagram of the preferred embodiment of the interface circuit of the present invention;

FIGS. 2A-2C show representative voltage-vs-time waveforms of the first, second and third control signals used to control the first, second and third control transistors of the interface circuit of FIG. 1;

FIG. 3 shows a voltage-vs-time plot of the voltage on the piezoelectric transducer during the operation of the circuit of FIG. 1; and FIG. 4 shows an amplitude-vs-time plot of a coherent acoustical wavefront generated by the interface circuit of FIG. 1.

DETAILED DESCRIPTION

With reference now to the drawings, FIG. 1 is a schematic block diagram of the preferred embodiment of an interface circuit 10 according to the present invention. Although not meant to be limiting, the interface circuit 10 is preferably used to interface a high frequency piezoelectric transducer 12 to an input stage 14 (e.g., an operational amplifier) of an echo ranging system 16. The echo ranging system 16, by way of example only, is used to measure the level of fuel in a storage tank or the like. Preferably, the transducer 12 is located at the bottom of the storage tank and is immersed in the fuel.

As will be described, the transducer generates a single coherent pulse which travels through the fuel and is then reflected off the liquid back to the transducer. The transducer is typically supported in a substantially vertical pipe or tube. This tube preferably includes a horizontal stub or fixed length adjacent the bottom end thereof for supporting a reference transducer. Both the vertical tube and the horizontal stub are permeable to the fuel. The reference transducer is adapted to generate a reference signal from which the speed of sound (in the fuel) can be calculated. Because the speed of sound in the fuel varies with temperature changes, the reference signal is used by the echo ranging system for calibration.

As seen in FIG. 1, the interface circuit 10 comprises first, second and third control transistors Q1, Q2, and Q3 which are controlled by a logic circuit, i.e., state controller 18. Each of the control transistors is preferably a high voltage, low resistance power amplifier such as an enchancement mode n-channel HEXFET. Of course, other types of power devices are also suited for use as the control transistors. The interface circuit 10 also includes a suitable charging circuit including a voltage source "V" connected to an inductor 20 through a charging resistor 22. The charging circuit operates in a well-known manner to tune the piezoelectric transducer to a predetermined voltage and frequency (e.g., 1MHz).

The first control transistor Q1 includes a drain "D" connected to the inductor 20 of the charging circuit, a source "S" connected to ground, and a gate "G" connected to a first output 24a of the state controller 18 via a voltage divider 26 and a (pnp) transistor 28. Voltage divider 26 comprises resistors 30 and 32. A logic high signal on the first output 24a of the state controller 18 turns transistor 28 ON which in turn fires the control transistor Q1. This operation causes the transducer 12 to generate a conherent acoustical wavefront as will be described.

The second control transistor Q2 includes a drain "D" connected to the transducer 12 via a damping resistor 34, a source "S" connected to the input stage 14 of the echo ranging system 16, and a gate "G" connected to a second output 24b of the state controller 18 via a voltage divider 36 and a (pnp) transistor 38. Voltage divider 36 comprises resistors 40 and 42. As seen in FIG. 1, the source of control transistor Q2 is also connected to the drain "D" of control transistor Q3 for the purposes to be described. In operation, a logic high signal on the second output 24b of the state controller 18 turns transistor 38 ON which in turn fires control transistor Q2. This initiates a rapid damping of the transducer output.

The third control transistor Q3 includes a source "S" connected to ground, and a gate "G" connected to a third output 24c of the state controller via a voltage divider 44 and a (npn) transistor 46. Voltage divider 44 comprises resistors 48 and 50. In operation, a logic high signal on the third output 24c of the state controller 18 turns transistor 46 ON which in turn fires control transistor Q3 to connect the input stage 14 to ground via the drain and source terminals of transistor Q3. As will be described, a logic low signal on the third output 24c turns transistor Q3 OFF, thereby opening the input stage 14 to receive a return or "echo" pulse via the transducer 12 and the control transistor Q2.

The operation of the interface circuit 10 can now be described with reference to FIGS. 2A-2C and 3. The state controller 18 generates first, second and third control signals on the first, second and third outputs 24a, 24b and 24c, respectively. Each of the control signals has a first and second logic state (i.e., a logic low and a logic high state). As seen in FIG. 2A, the first control signal is initially at a logic low state and is changed to a logic high state at a first predetermined time T1. The second control signal, shown in FIG. 2B, is also initially at a logic low state and is changed to a logic high state at a second predetermined time T2 after the first predetermined time T1. Finally, as seen in FIG. 2C, the third control singal is initially at a logic state and is changed to a logic low state at a third predetermined time T3 after the second predetermined time T2. The third control signal is designed to be at the logic high state prior to the first predetermined time T1 and until after the second predetermined time T2.

The first, second and third control signals are connected to the first, second and third control transistors Q1, Q2 and Q3, respectively, in order to control the interface circuit. In particular, following charging of the transducer 12 as seen in FIG. 3, the first control signal turns transistor Q1 ON at time T1. This operation generates the coherent acoustical wavefront 52 as shown in FIG. 4. The wavefront has a first positive portion 52a and a second negative portion 52b. The wavefront is designed to remain coherent as the pulse travels to the liquid surface.

Thereafter, at time T2, the second control signal turns control transistor Q2 ON, thereby immediately damping the output of the transducer 12 as shown in FIG. 3. This operation causes the wavefront 52 to "collapse" substantially as shown in FIG. 4. While control transistors Q1 and Q2 are being activated to produce the transmission and damping cycles, transistor Q3 has been ON (due to the logic high control signal on line 24c). When transistor Q3 is ON, the input stage 14 of the echo ranging system 16 is clamped or "shorted" to ground via the drain and source terminals of transistor Q3, thereby preventing the echo ranging system 16 from "listening" for the echo pulse. At time T3, however, the control transistor Q3 is turned OFF, thereby enabling the transducer 12 to listen for and receive the echo pulse from the target. At time T4, each of the control signals is returned to its original logic state. Alternatively, the third control signal may be selectively switched back to the logic high state (to clamp the input stage 14 to ground) upon receipt of the return pulse.

The first control transistor Q1 therefore activates the transducer, the second control transistor Q2 damps the transducer output and the third control transistor Q3 isolates the transducer from the remainder of the echo ranging system during the transmission and damping cycles of operation. Moreover, the interface circuit advantageously generates only a single coherent acoustical pulse. This enables the transducer to be immediately damped and placed in condition to receive the echo pulse.

Because the transducer output is a high frequency coherent ranging pulse, any energy which is received by the transducer following damping will necessarily reflect true range information rather than noise or other ambient information. Therefore, the present invention significantly reduces the uncertainty surrounding the time-of-arrival of the echo pluse, thereby increasing the ranging accuracy of the echo ranging system. The interface circuit thus advantageously enables the echo ranging system to provide accurate ranging where the transducer is located near the liquid surface (or other target) to be measured or where the transducer is located far away from the target.

Although the invention has been described in detail, the same is by way of illustration and example only and is not to be taken by way of limitation, the spirit and scope of the invention being limited only to the term of the appended claims.

It is claimed:

1. An interface circuit for connecting a transducer to an input stage of an echo ranging system, comprising:
   means for charging the transducer to a predetermined voltage;
   first transistor means connected to the charging means, second transistor means connected between the transducer and the input stage, and third transistor means connected between the input stage and ground for isolating the transducer from the input stage during operation of the first and second transistor means; and
   control means for controlling the first transistor means to generate a single coherent pulse at a first predetermined time, for controlling the second transistor means for damping the transducer at a second predetermined time after the first predetermined time, and for controlling the third transistor means of clamp the input stage to ground prior to the first predetermined time until after the second predetermined time to thereby isolate the transducer from the input stage during generation of the pulse and damping of the transducer.

2. The interface circuit as described in claim 1 wherein the control means includes means for generating first, second and third control signals each having first and second logic states, the first control signal changing from the first logic state to the second logic state at the first predetermined time, the second control signal changing from the first logic state to the second logic state at the second predetermined, time, and the third control signal changing from the second logic state to the first logic state at a third predetermined time after the second predetermined time.

3. The interface circuit as described in claim 1 wherein the transducer is a high frequency piezoelectric transducer.

4. The interface circuit as described in claim 1 wherein the charging means includes a voltage source and an inductor.

5. The interface circuit as described in claim 1 wherein each of the first, second and third transistor means includes an enhancement mode n-channel transistor having a drain, gate and source.

6. An interface circuit of connecting a high frequency piezoelectric transducer to an input stage of an echo ranging system, comprising:
  means for charging the piezoelectric transducer to a predetermined voltage;
  first transistor means connected to the charging means and having a control input;
  second transistor means connected between the piezoelectric transducer and the input stage and having a control input;
  third transistor means connected between the input stage and ground and having a control input, the third transistor means for isolating the piezoelectric transducer from the input stage during operating of the first and second transistor means;
  means for generating first, second and third control signals each having first and second logic states, the first control signal changing from the first logic state to the second logic state at a first predetermined time, the second control signal changing from the first logic state to the second logic state at a second predetermined time after the first predetermined time and the third control signal changing from the second logic state to the first logic state at a third predetermined time after the second predetermined time; and
  means for connecting the first control signal to the control input of the first transistor means to generate a single coherent acoustical pulse at the predetermined frequency at the first predetermined time, for connecting the second control signal to the control input of the second transistor means for damping the acoustical pulse at the second predetermined time and for connecting the third control signal to the control input of the third transistor means at the third predetermined time for disconnecting the third transistor means for the input stage of the echo ranging system to enable the transducer to receive an echo pulse from a target.

7. The interface circuit as described in claim 6 wherein each of the transistor means includes a high voltage, low resistance transistor having a drain, gate and source.

8. The interface circuit as described in claim 6 wherein the generating means comprises a state controller.

9. The interface circuit as described in claim 6 wherein the charging means comprises a voltage source and an inductor.

10. A method for connecting a high frequency piezoelectric transducer to an input stage of an echo ranging system, comprising the steps of:
  clamping the input stage to ground to thereby isolate the piezoelectric transducer from the input stage;
  activating the transducer to generate a coherent acoustical pulse while the input stage remains clamped to ground;
  damping the transducer output following generation of the acoustical pulse and while the input stage remains clamped to ground; and
  disconnecting the input stage from ground to enable the transducer to receive an echo pulse from a target.

* * * * *